Oct. 31, 1961   A. J. ANTHONY   3,006,609
FLUIDIZED HEAT EXCHANGER
Filed Sept. 12, 1955

INVENTOR.
Andrew J. Anthony
BY
Wayne H. Lang
AGENT

# United States Patent Office 3,006,609
Patented Oct. 31, 1961

3,006,609
FLUIDIZED HEAT EXCHANGER
Andrew J. Anthony, Tariffville, Conn., assignor to The Air Preheater Corporation, New York, N.Y., a corporation of New York
Filed Sept. 12, 1955, Ser. No. 533,662
1 Claim. (Cl. 257—55)

The present invention relates generally to pebble heat exchange apparatus or chemical reactors of a type adapted to effect physical contact between a stream of hot gas or other vapor and a continuously flowing stream of fine pebbles or other granular solids.

Conventional pebble heat exchange apparatus usually comprises two chambers disposed in substantially vertical alignment so that solid heat exchange material introduced into the upper portion of the top chamber forms a fluent bed which flows downwardly through the first chamber in direct contact with a first fluid. There the solid heat exchange material absorbs heat from the first fluid and is then passed on to a second or lower chamber where it contacts a second fluid to impart the absorbed heat thereto.

Processes carried out in the usual heat exchanger or chemical reactor require direct contact between fluids and solids, and the heat transfer efficiency of apparatus of this type is dependent to a large extent upon the size of the granular particles utilized in the operation, the more highly efficient apparatus utilizing extremely fine particles having a high surface to volume ratio.

It is therefore a general object of this invention to provide a pebble heat exchange apparatus. It is another object of this invention to provide a pebble heat exchange apparatus which is particularly adapted for use with extremely finely divided particles. It is a further object of this invention to provide a pebble type heat exchange apparatus which especially utilizes fans and gas cleaning apparatus usually provided in fuel combustion systems. These and other objects and advantages will be apparent to those skilled in the art upon study of the accompanying specification and drawing.

For a better understanding of the invention reference may be had to the drawings in which.

Figure 1:
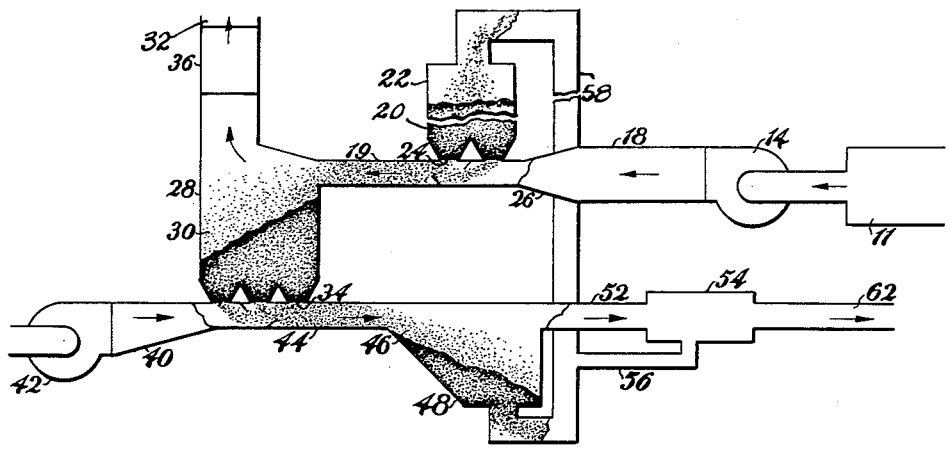
FIGURE 1 is a schematic elevation of a fluidized regenerative heat exchanger or chemical reactor arranged according to this invention.

Referring more specifically to FIGURE 1, hot gases from a source of heat 11 are drawn through a fan 14 which exhausts through a duct 18 having a throat portion 26 leading to a chamber 19 of reduced diameter to provide a restricted aspirator tube. Chamber 19 opens directly to a relatively large chamber 30 within a hopper 28, whereby fluid delivered by fan 14 through duct 18 is restricted in throat 26 before it flows through duct-like chamber 19 to plenum chamber 30 and is permitted to expand and lose its velocity.

A hopper 22 containing a quantity of heat exchange medium 20 has one or a plurality of nozzle-like openings 24 which provide intercommunication between the chamber 20 and throat 26. When fluid from fan 14 is forced through restricted throat portion 26 an ejector effect is produced so that heat exchange particles from chamber 20 are drawn by suction through openings 24 into the chamber 19 where they are placed in direct heat exchange relationship with the fluid flowing therethrough. The heat exchange particles 20 absorb heat from the hot gases and are carried through chamber 19 by the flowing gas. When the gas stream reaches plenum chamber 30 it expands greatly and loses velocity so that the heated particles carried thereby are permitted to become disentrained and settle to the bottom of hopper 28 which is formed with one or more openings 34. The openings 34 interconnect chamber 30 with a chamber 44 receiving fluid being discharged from a fan 42 through a restricted throat 40. The ejector effect of fluid flowing through throat 40 into chamber 44 draws heated particles from hopper 28 into throat 40 where they are re-entrained in the fluid discharging from fan 42. As the particle entrained fluid flows from throat 40 through chamber 44, heat from the particles is transmitted to the carrier fluid and as the carrier fluid expands into a plenum chamber 46 it loses velocity and drops its entrained particles into a hopper 48. The heated carrier fluid then passes on through a duct 52 including a gas cleaning device 54 which removes any residual particles from the fluid stream. Such particles are directed through a duct 56 to a conveyor 58 where they join cooled heat transfer particles being transported from hopper 48 to hopper 22 in preparation for a repeat cycle. Heated fluid substantially devoid of all entrained particles is then directed from the collector 54 through a duct 62 to the point of use.

Sealing between fluids in the spaced conduits is effected by the resistance afforded by the column of particles in each of hoppers 22 and 28, however, additional sealing means may be utilized in event the column of particles is insufficient to maintain separation of fluids. Similarly, if it is deemed necessary, a gas cleaning device 36 may be installed in the exhaust duct 32 to remove excessive particle carry-over to this duct.

The fluidized material for the device of FIGURE 1 may comprise any chemical catalyst or heat exchange material of such finely divided nature that it may be readily entrained in the gaseous fluids exhausting from fans 14 and 42.

Figure 2:
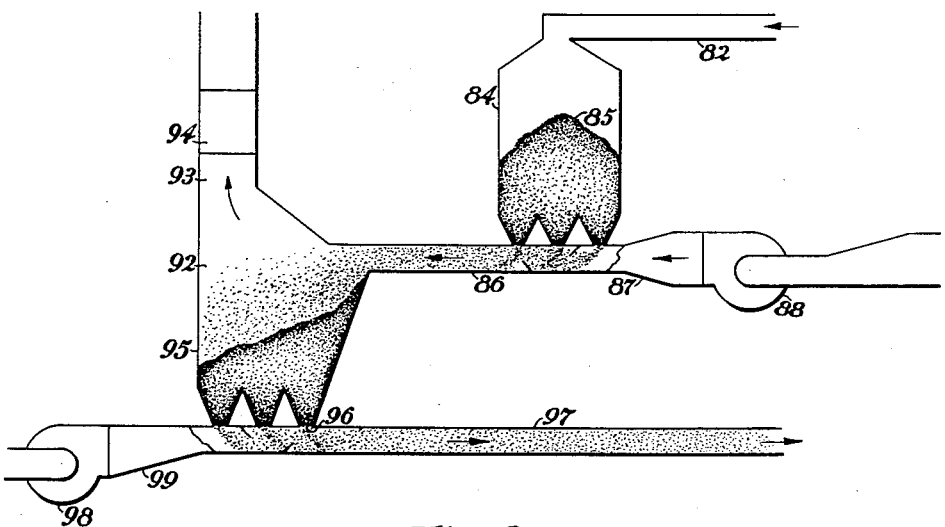
FIGURE 2 is a schematic elevation of a modified form of the invention.

FIGURE 2 discloses a fuel heating system operatively similar to the heat exchange system of FIGURE 1. However, here a mass of combustible fuel particles 85 such as pulverized coal is used as the heat exchange medium. Such particles are supplied through a duct 82 to a hopper 84 where they are stored for delivery to a conduit 86. As in the device of FIGURE 1, the particles in hopper are drawn into conduit 86 by the ejector effect produced by gaseous fluid from a fan 88 flowing through a restriction 87 to the conduit 86. In the conduit, particles 85 are inter-mixed with hot gas from fan 88 thereby permitting the particles to absorb heat from the gas before separation therefrom in a chamber 92. The cooled gases are directed upward through an outlet 93 to the atmosphere or, as in the device of FIGURE 1, a gas cleaning device 94 may be provided to further clean the exhaust gas before it is vented to the atmosphere.

Heated fuel particles collect in a hopper 95 and are subsequently drawn through openings 96 by the ejector effect produced when primary air is drawn through a fan 98 and forced through restriction 99 to a conduit 97. While passing through conduit 97 in contact with the heated particles 85, the cool combustion air absorbs a limited amount of heat from the heated fuel particles before both the air and fuel are delivered to the burner or other point of combustion.

Since the device of FIGURE 2 utilizes a combustible material as the heat exchange medium it is important that the temperature of the fuel and fuel-air mixture be maintained well within certain limits as determined by the ignition temperature of the fuel. Furthermore, since most of the transfer of heat between the carrier fluid and fuel particles occurs during the brief interval the fuel is being drawn into the conduits 86 or 97, the openings 96 may be utilized to supply the fuel directly to a fuel combustion chamber without experiencing any great loss of efficiency.

These and other modifications of the disclosed invention which will become apparent to those skilled in the art upon study of the accompanying disclosure are believed to be entirely within the spirit and scope of the present disclosure.

What I claim is:

Regenerative heat exchange apparatus for the transfer of heat from a heating fluid to a fluid to be heated comprising in combination a first conduit that defines a passageway for the heating fluid and a second conduit subjacent thereto that defines a passageway for the fluid to be heated: storage means for particulate material positioned above the first conduit; a first aspirator in the first conduit having a suction inlet in the storage means adapted to draw particulate material from the storage means into the first conduit in response to the flow of the heating fluid therethrough; collecting means in the first conduit adapted to remove heated particulate matter from the heating fluid; a second aspirator in the second conduit having a suction opening in the collecting means of the first conduit adapted to draw heated particulate material into the second conduit in response to the flow of the fluid to be heated therethrough; a second collecting means in the second conduit adapted to effect release of particulate material from the fluid; and means adapted to lift particulate material from the second collecting means to the storage means for a repeat cycle of operation.

References Cited in the file of this patent

UNITED STATES PATENTS

| | | |
|---|---|---|
| Re. 17,212 | Stockton | Feb. 12, 1929 |
| 2,280,129 | Reinders-Folmer | Apr. 21, 1942 |
| 2,726,135 | Davis | Dec. 6, 1955 |
| 2,735,744 | Rex. | Feb. 21, 1956 |
| 2,813,699 | McIntire et al. | Nov. 19, 1957 |